UNITED STATES PATENT OFFICE.

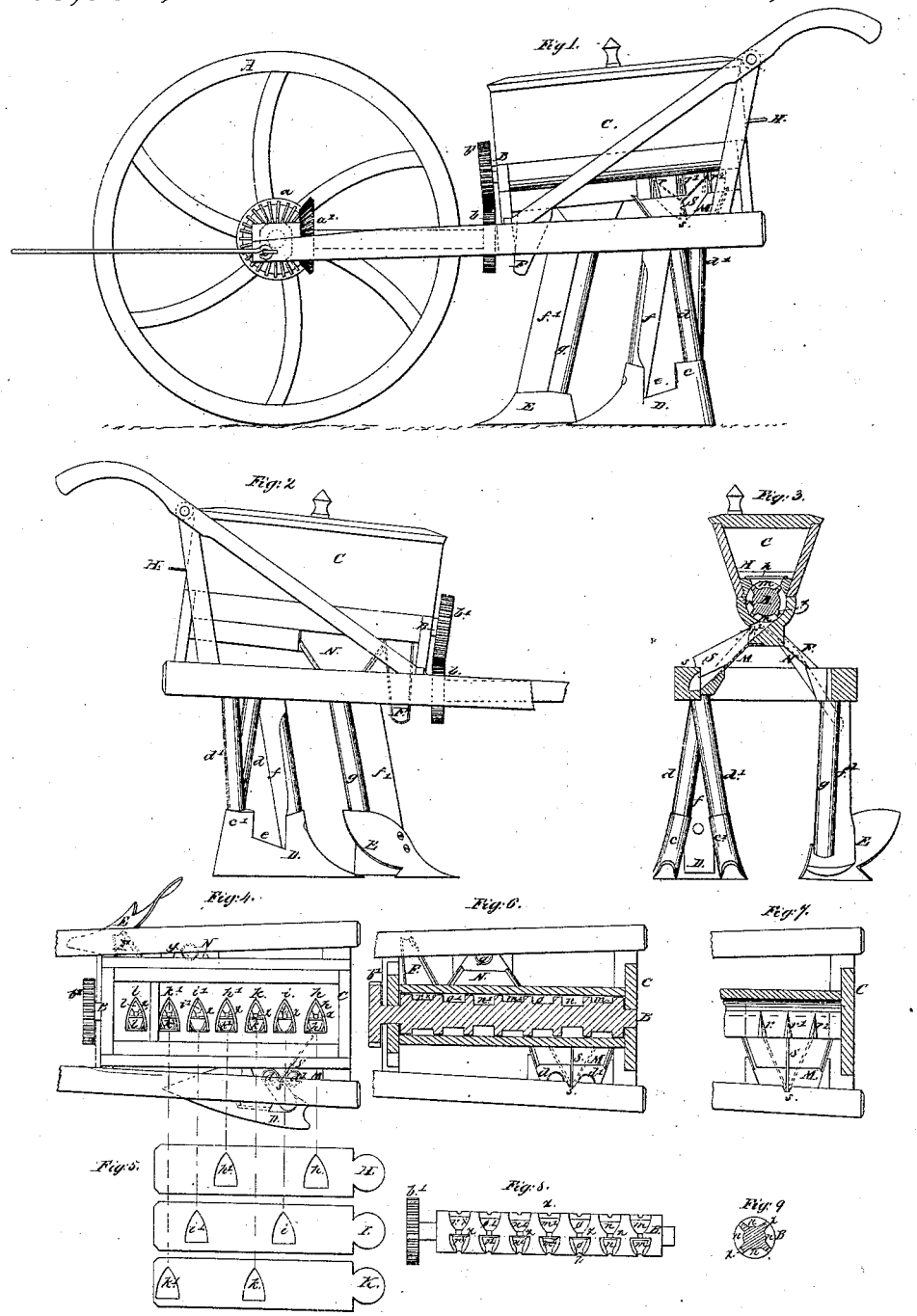

ALBERT FRANKLIN, OF GENOA CROSS-ROADS, OHIO.

IMPROVEMENT IN SEEDING-MACHINES.

Specification forming part of Letters Patent No. 18,579, dated November 10, 1857.

*To all whom it may concern:*

Be it known that I, ALBERT FRANKLIN, of Genoa Cross-Roads, in the county of Delaware and State of Ohio, have invented a certain new and useful Improvement in Grain-Drills, of which the following is a full, clear, and exact description, reference being had to the accompanying drawings, which form part of this specification, and in which—

Figure 1 represents a side elevation of the machine; Fig. 2, a similar view of the rear portion, but viewed from the opposite side; Fig. 3, a transverse section, looking toward the front through the rear portion of the hopper, and intersecting the hopper and feed-cylinder through their hindmost delivery-openings, in connection with which are used fixed and removable dividers for dividing the discharge, as hereinafter explained; Fig. 4, a top view or plan of the rear portion, showing the hopper uncovered and the regulating top slide covering the discharge-openings therein removed; and Fig. 5, a plan of three such regulating-slides having their openings differently arranged to suit changes in the feed, as specified hereinafter; Fig. 6, a horizontal section of the rear portion, in part, through the hopper and feed-cylinder; Fig. 7, a horizontal sectional view, taken below the hopper, mainly, of the rear fixed and removable divider arrangement before referred to; Fig. 8, a longitudinal outside view of the feed-cylinder detached, and Fig. 9 a transverse section of the same.

This machine is designed to be used principally for sowing among standing corn such grain as wheat, barley, or rye, the advantages of which mode of planting, with gain to the standing crop, and plowing between the rows, are well known to farmers, and machines for said purpose have before been constructed. Other planting may also be done.

The machine represented in the accompanying drawings necessarily embraces details common in their general action and arrangements to other grain-drills, and hence only passing reference will here be made to certain portions.

The running-wheel A of the machine is arranged in front, and serves to drive by bevel and spur gear $a\ a'\ b\ b'$ the feed-cylinder B, which is situated lengthwise of the hopper C, in direction of the machine's travel.

The machine is fitted with two side plows, D and E. The plow D, on the left-hand side, has two drills, $c\ c'$, in which are inserted two tubes, $d\ d'$, to convey the grain to them as fed or discharged by the machine. The dirt rising in front of this plow passes between the two drills, as well as on the outside, the plow having a recess, $e$, or being made low behind the standard $f$, which carries the plow.

The plow E, on the right-hand side of the machine, has but one drill-tube, $g$, behind the standard $f'$, which carries said plow. The grain deposited through this tube is covered by the dirt coming on the landside of said plow, while the mold-board of the same plow serves to cover or throw up the dirt over a broadcast distribution of grain, which is made on the same (right-hand) side, among the hills, by a spout, F, connected with the hopper and arranged in front of the standard $f'$, that carries the right-hand plow, E. The grain is thus planted in drills on opposite sides, and with a broadcast-distributer combined in certain or relative proportions, as hereinafter explained, a discharge of varying amounts taking place from all simultaneously, and this arrangement I find better equalizes and improves the planting, the machine being traversed twice in a row, first up and then down, which of course renders only necessary the one broadcast-distributer at the one side to scatter the grain among the hills on both sides.

The grain is fed from the hopper $c$ to the several discharge arrangements before mentioned through inclined, triangular, or pointing to one side openings $h\ h'$, $i\ i'$, $k\ k'$, and $l$, in the bottom of the hopper, accordingly as which two of the six rear of these openings are open by the insertion through the back of the hopper over its bottom of either one of a series of regulating-slides, H I K, having, respectively, openings in them, two each, $h\ h'$, $i\ i'$, $k\ k'$, corresponding in shape and arrangement to the openings (indicated by the same letters) in the bottom of the hopper, so as to form an open communication in pairs or sets of two only at different points or distances along the hopper to the several drill-tubes, according ly as which regulating-slide H I K is used, for the purpose of varying the amount of grain discharged during a rotation of the feed-cylinder B, as desired. While two are always open, four of said drill-supply openings in the bottom of the hopper, it will be observed, are closed in the use of either of the regulating-slides, the position, not the number or superficial area of said openings, being changed by the varying of the slides, but the amount of discharge down the drill-tubes, though governed by the changing of the regulating-slides H I K, is otherwise directly provided for or effected, as seen in after description. The one opening, $l$, in the bottom of the hopper, to supply the broadcast-distributing spout F, has a fixed discharge, the regulating-slides not covering it. Mere regulating-slides to vary the amount of discharge I am aware have before been used.

The feed-cylinder B has a series of divided cells, $m\ m'$, $n\ n'$, $o\ o'$, $r^\times$, corresponding in number and arrangement to the discharge-openings in the bottom of the hopper—that is, as regards the longitudinal disposition of them along the cylinder—there being any number of said cells in their circular arrangement around the cylinder to each transverse division of it, Figs. 3 and 9 showing four in a circular row, and each circular row of cells constituting one set working under the same opening in the bottom of the hopper, and the several "sets" working under different openings. The several cells in each circular row or set are of the same depth or capacity, but the several sets $m\ m'$, $n\ n'$, $o\ o'$, which supply the drill-tubes, of different capacity, as shown in Fig. 6, so that when the one slide, H, is used the feed is through the openings $h\ h'$ to give a supply—say in connection with the broadcast-distributer—of a bushel and a half of grain to the acre. When the slide I is inserted instead, and the feed established through the openings $i\ i'$, a supply of two bushels to the acre is given by reason of the receiving-cells $n\ n'$ then in operation being of greater capacity than the cells $m\ m'$ in operation under the use of the slide H; and when the slide K is inserted and the supply established through the openings $k\ k'$ and different-sized cells $o\ o'$, a discharge is produced of, say, a bushel and three pecks to the acre.

The feed from the receiving-cells in the cylinder to the drill-tubes $d\ d'$ and $g$ during the rotation of the feed-cylinder B is effected by connecting-spouts M N. The one spout, M, which supplies the two drill-tubes $d\ d'$ on the left-hand side of the machine, has a removable divider, S, operating in connection with it. (See Figs. 1, 3, 4, 6, and 7.) This removable divider fits at its lower end a notch, $s$, in the frame between said drill-tubes $d\ d'$, and fits at its upper end in either one, at pleasure, of three stationary dividers, $r\ r'\ r^2$, arranged in line with or under the center of three hindmost circular rows of cells, $m\ n\ o$, in the feed-cylinder, to divide the grain being discharged from either one of said circular rows equally to the two drill-tubes $d\ d'$ and prevent choking of the one of either of said tubes, one circular row of cells in the feed-cylinder thus supplying two drill-tubes. The change of the removable divider S at its top end is made to either of the three stationary dividers $r\ r'\ r^2$, accordingly as the slides H I K are changed to turn the supply through either one of the three hindmost openings $h\ i\ k$ in the hopper-bottom and their corresponding cells, $m\ n\ o$, in the feed-cylinder. The several cells $m\ m'$, $n\ n'$, $o\ o'$, and $r^\times$ of each circular row in the feed-cylinder correspond, as regards triangular form, to the discharge-openings $h\ h'$, $i\ i'$, $k\ k'$, and $l$ in the hopper-bottom, but are so arranged round said cylinder as that their apices or points occupy a reversed position to the points or apices of the hopper-bottom openings, as the cells in the rotation of the cylinder come under said openings during the travel forward of the machine to plant. (See Figs. 4 and 8.) Thus it will be seen that the mechanical arrangement for supply of the feed-cylinder is of a double-wedge character—the one fixed and the other movable—the base of the one wedge (or cell) moving in advance and first passing the apex of the other wedge, (or hopper-bottom opening,) and the apices of the two wedges gradually closing on each other, whereby the grain is drawn from the hopper in the most regular, gradual, and certain manner without tendency to scatter or crowd at the one side of the cells, so that the feed-cylinder operates more easily and the discharge is more evenly distributed.

In taking the feed the final pressure of the grain in each cell $m\ m'$, $n\ n'$, $o\ o'$, and $r^\times$, as it passes its supply-opening in the hopper-bottom, is toward the apex or point of said cell. To prevent the grain being cut or damaged at this point, and the more effectually to relieve the cells from being overcrowded, should the cylinder not rotate quite true in its bed, I form a small crease, channel, or open connection, $z$, of sufficient capacity to receive, say, one grain or kernel between the apex of the one cell and the base of the next cell in the same circular row of cells, through which channel $z$ grain not freely passing the pointed extremities of the openings in the hopper-bottom, as the receiving-cells are about completing their traverse under said openings, will be effectually guided and forcibly compressed, but gradually, into the next vacant cell in the same circular row by the combined action of the two wedge-shaped extremities of the feed-cylinder cells and openings in the hopper-bottom, closing on and passing each other. Thus the several cells in a row are divided, but in a manner connected, and this arrangement surpasses, as a "clearer," any spring appliances, both in efficiency, simplicity, and durability.

What I claim as new and useful herein, and desire to secure by Letters Patent, is—

The combination of the wedge-shaped or triangularly-formed discharge-openings $h\ i$ of the hopper C with the similar-shaped cells $m\ n$ in the feed-cylinder B, arranged for operation in everse directions to each other, and the several cells in each circular row of said cylinder forming, though divided, a continuous opening by means of channel $z$, connecting the apex of the one cell with the base of the other, for the purposes herein set forth.

In testimony whereof I have hereunto subscribed my name.

ALBERT FRANKLIN.

Witnesses:
W. H. ALLEN,
T. B. CORNELL.